United States Patent [19]
Damilano

[11] Patent Number: 5,831,572
[45] Date of Patent: Nov. 3, 1998

[54] METHOD AND APPARATUS FOR MEASURING SATELLITE ATTITUDE USING GPS

[75] Inventor: Patrice Damilano, Toulouse, France

[73] Assignee: Matra Marconi Space France, France

[21] Appl. No.: 758,443

[22] Filed: Nov. 29, 1996

[30] Foreign Application Priority Data

Dec. 1, 1995 [FR] France ................... 95 14228

[51] Int. Cl.$^6$ ................................... H04B 7/185
[52] U.S. Cl. .................... 342/352; 342/354; 342/355
[58] Field of Search ........................ 342/352, 354, 342/355

[56] References Cited

U.S. PATENT DOCUMENTS

| | | | |
|---|---|---|---|
| 4,405,986 | 9/1983 | Gray | 364/434 |
| 4,617,634 | 10/1986 | Izumida et al. | 364/455 |
| 5,548,293 | 8/1996 | Cohen | 342/357 |
| 5,561,432 | 10/1996 | Knight | 342/357 |

OTHER PUBLICATIONS

Wertz, Ed., Spacecraft Attitude Determination and Control, D. Reidel Publishing Co., Holland, pp. 184 & 186. 1985.
500 Years after Columbus –Navigation Challenges of Tomorrow, Monterey, CA., Mar. 23 –27, 1992, 1 Jan. 1992, Institute of Electrical and Electronics Engineers, p. 544 XP000344349 Stein B A et al: "Satellite Attitude Determination using GPS" * le document en entier *.

Position Location and Navigation Symposium 1,8 (Plans), Las Vegas, Apr. 11 –15, 1994, 11 Apr. 1994, Institute of Electrical and Electronics Engineers, pp. 598–604, XP000489397 Unwin et al: "Results from the PoSaT GPS Experiment" * le document en entier *.

Signal Processing Theories and Applications, Barcelona, Sep. 18 –21, 1990, vol. 3, 18 Sep. 1990, Torres L;Masgrau E; Lagunas M A, pp. 1747–1750, XP000365903 Lucas R et al: "Global Positioning System Integrated Navigation and Attitude Determination System (GINAS)" * le document en entier *.

*Primary Examiner*—Joseph L. Felber
*Attorney, Agent, or Firm*—Gary M. Nath; Nath & Associates

[57] ABSTRACT

The apparatus has n non aligned antennas, where n is at least for receiving radio signals from a plurality of OPS satellites. Radio frequency signals received by the various antennas are processed for measuring their phase differences, and for computing attitude on the basis of said phase differences. The measurement and computing system is repeatedly calibrated on the basis of measurements performed by a star sensor during periods when it provides usable data.

10 Claims, 5 Drawing Sheets

METHOD AND APPARATUS FOR MEASURING SATELLITE ATTITUDE USING GPS

BACKGROUND OF THE INVENTION

The present invention relates to a method and apparatus for measuring the attitude of an earth satellite in a frame of references A particularly important application lies with satellites placed in low orbit, in the altitude range 400 km to 1400 km.

At present, the attitude of satellites is measured by using optical sensors of heavenly bodies (star sensors, sensors of the earth's or the sun's horizon). Star sensors have the advantage of high accuracy. However, apparatuses including a star sensor suffer from the drawback of being blind when the sensor is facing a star hole, or when it is dazzled by a heavenly body constituting a source of bright light.

It is necessary to maintain a measurement of satellite attitude even during periods when the optical sensor is blind, in particular in order to be able to control attitude during such periods, which may amount to as much as 5% of time for a satellite in low orbit. For this purpose, the apparatus may be provided with gyros. They provide a reference during periods of blindness, but they are incapable of absolute measurement and they suffer from drift.

SUMMARY OF THE INVENTION

An object of the present invention is to provide apparatus for measuring attitude and including, in addition to one or more heavenly body sensors, means enabling measurement accuracy to be conserved with little loss during periods of blindness.

To this end, the invention provides more particularly apparatus placed on a satellite, the apparatus having a nonaligned antennas (where n is not less than 3) for receiving radio signals from a plurality of satellites in a satellite global positioning system (GPS), means for processing radio frequency signals received by the various antennas, for measuring their phase differences, and for computing attitude on the basis of said phase differences. Means are provided for repeatedly calibrating the measurement on the basis of measurements performed by the star sensor during periods when it provides usable data.

At altitudes in the range 400 km to 1400 km, a satellite is always directly in sight of at least three GPS satellites, thereby enabling attitude to be measured continuously.

A measurement performed solely on the basis of signals received from GPS satellites would be of considerably lower accuracy than a measurement obtained using a heavenly body sensor. However the measurement and computing means can be calibrated on the basis of information delivered by the star sensor. The apparatus then makes it possible during star holes or dazzling to obtain accuracy that is nearly equal to that provided from the data delivered by the star sensor.

Relying on GPS also makes it possible to avoid a defect of apparatuses that make use of a star sensor, on its own or in association with a gyro, namely the need to perform an initial procedure of recognizing constellations in the field of view of the sensor. Using GPS makes it possible at any instant to know the position of the satellite, its velocity vector, and the time. GPS also makes it possible to know initial attitude with sufficient accuracy to be able to identify stars in the field of the sensor and to avoid the need for constellation searching.

The spacing between the antennas for receiving the radiofrequency signals coming from the GPS satellites is generally considerably greater than the wavelength (about 20 cm) of the radiofrequency signals from the GPS satellites. Initial ambiguity concerning attitude can therefore exist because phase differences are measured modulo $2\pi$. Ambiguity can be removed in several ways. Satellite acquisition mode may be such that the initial pointing accuracy is sufficient for there to be no ambiguity. The number n of antennas may be sufficient for it to be possible to remove ambiguity by making correlations between a plurality of attitude measurements each performed using a different set of three antennas. Finally, the information provided by the magnetometer that is generally provided on board a satellite orbiting in the geomagnetic field enables an attitude measurement to be performed that is approximate, but good enough to remove ambiguity.

The above characteristics and others will be more apparent on reading the following description of a particular embodiment given by way of non-limiting example. The description refers to the accompanying drawings.

DETAILED DESCRIPTION

Figures 1, 2, 3:
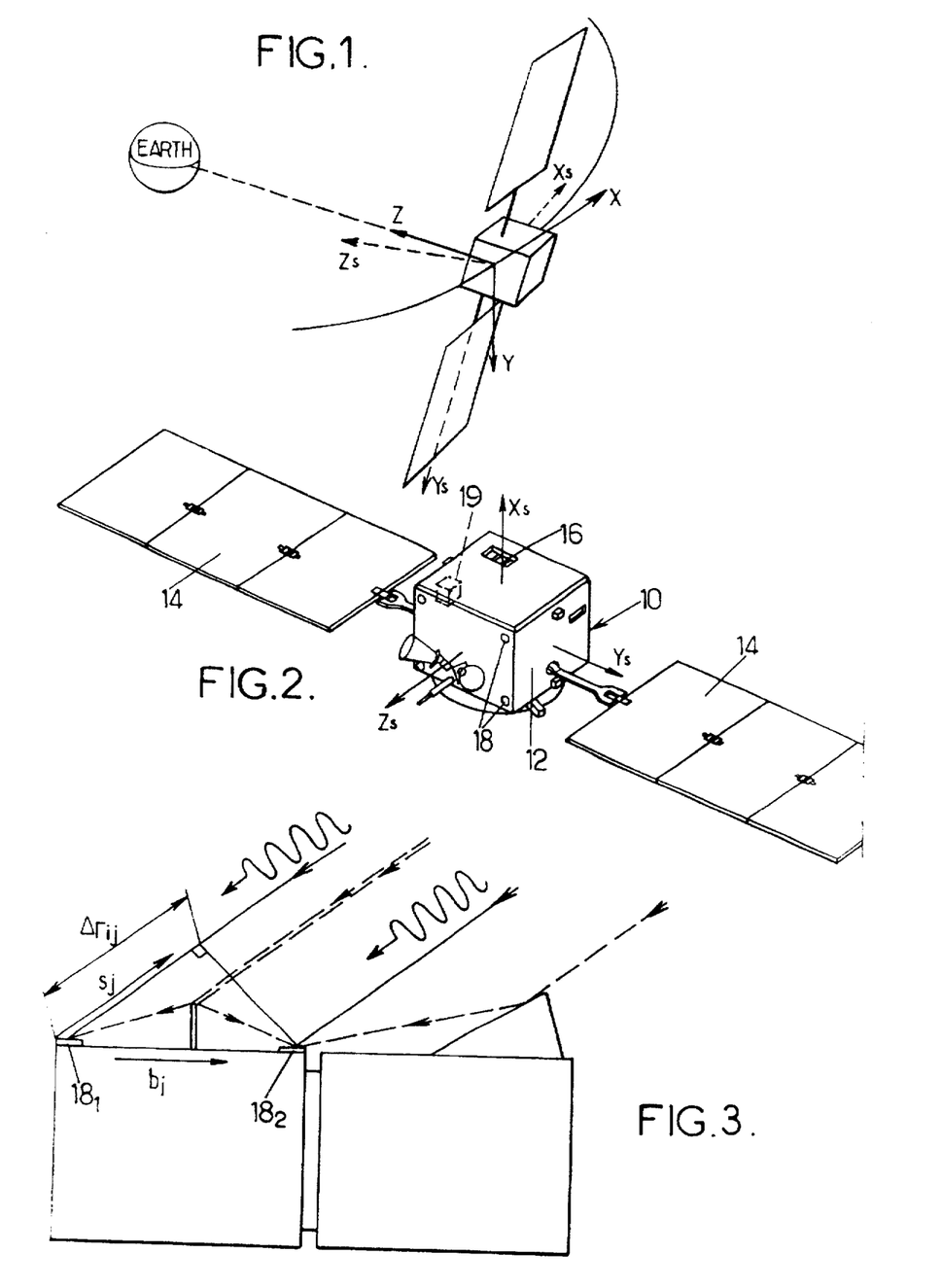
FIG. 1 is a theoretical diagram showing parameters that enable the attitude of a satellite in earth orbit to be defined.
FIG. 2 shows one possible way in which a star sensor and GPS antennas may be disposed on a satellite to enable the invention to be performed.
FIG. 3 is a theoretical diagram showing how the attitude of a satellite can be measured by GPS interferometry, and also showing the effect of multiple paths.

Usually, it is desirable to know the attitude of a satellite relative to a reference coordinate system tied to the orbit, or "local orbital reference frame". FIG. 1 shows such a reference coordinate system constituted by a Z-axis pointing towards the center of earth, a Y-axis normal to the plane of the orbit, and an X-axis in the velocity direction. The attitude of the satellite can then be defined by the transformation matrix converting a coordinate system tied to the satellite body to the local orbital reference frame XYZ. The coordinate system tied to the satellite may, in particular, comprise an axis Ys orthogonal to two faces (e.g. north and south for a satellite in equatorial orbit), an axis Zs (whose reference direction is towards the earth in the frequent case of earth pointing), and an axis Xs orthogonal to the other two axes.

FIG. 2 shows one possible structure for a satellite 10 whose attitude relative to the earth is to be determined. This satellite comprises a body 12 and solar panels 14. The body carries a star sensor 16 with a wide angular field of view. The star sensor may be associated with a sensor of the earth's or the sun's horizon.

To implement the invention, it is possible to use a star sensor 16 having a wide field. A field of 30°×30°, or more generally lying in the range 25×25° to 35°×35° is generally appropriate. It enables attitude to be measured relative to three axes providing at least two stars are visible in the field of view. Such a sensor has the advantage of making detection possible solely on the basis of bright stars of numerically low magnitude, e.g. less than four. This means the star catalog that needs to be stored does not exceed 300 stars, thereby facilitating management and enabling image processing to be performed on board the satellite.

In accordance with the invention, the body 12 of the satellite also carries at least three antennas for receiving signals transmitted by GPS satellites. In the example shown in FIG. 2, four antennas 18 are provided, at the four corners of the satellite so as to obtain maximum accuracy. As explained below, each attitude measurement by GPS interferometry can be performed using a set of only three antennas. By performing a plurality of measurements, each time using a different set of three antennas, it is possible to increase accuracy and also to remove ambiguity. Ambiguity may also be removed by using the signals provided by a magnetometer 19 carried by the body of the satellite.

To reduce the effects of multiple paths caused by reflections of the microwave GPS signals, it is advantageous to provide each antenna 18 with a mask that limits the angular opening of its reception cone to a value that is smaller than 180°, e.g. to 140°. For a satellite placed in low orbit (in altitude range 400 km to 1400 km), and when using such a mask, the number of GPS satellites directly in view over a period of twelve hours varies from three to eight.

FIG. 3 shows how attitude is measured by interferometry using signals supplied by two GPS antennas. The phase difference between the signals provided by the two antennas $18_1$ and $18_2$ depends on the orientation of the baseline b (the line connecting $18_1$ to $18_2$) relative to the direction defined by a unit vector $s_j$ of the incident wave coming from a GPS satellite numbered j. The number of measurements possible is equal to the product of the number of GPS satellites that are simultaneously visible multiplied by the number of available antenna baselines. Often these antennas are grouped together so that one of them constitutes a master antenna constituting a common reference, while each of the others constitutes a slave antenna.

Using the following notation:

$b_i$: baseline of the i-th antenna;

$B=(b_i, \ldots, b_i, \ldots)$;

$s_j$: unit vector of the incident signal for the j-th GPS satellite;

$S=(s_i, \ldots, s_j, \ldots)$;

A: rotation matrix for transforming the reference frame to the satellite frame (satellite body coordinate axes);

$\Delta\phi_{ij}$: phase difference between two antennas for a carrier wave from OPS satellite of order j;

$\lambda$: wavelength of the GPS carrier under consideration;

$\delta\phi_{ij}$: disturbance due to multiple path differences between the two antennas on the baseline (differences between phase diagrams) for baseline i and satellite j;

$b_{ij}$: noise for baseline i and GPS satellite of order j; and $B_0=(b_{ii}, \ldots, b_{ij}, \ldots)$;

The following relation exists:

$$\Delta\phi_{ij}=(2\pi/\lambda)b^T_i.A.S_j+\delta\phi_{ij}+b_{ij} \qquad (1)$$

In equation (1), $\delta\phi_{ij}$ constitutes an error term due essentially to multiple paths that are different for each baseline and for each GPS satellite. This term varies slowly in time.

Consequently, a value computed by calibration using a star sensor can be stored for the following period of blindness.

If:

$$R=((\lambda/2\pi)\Delta\phi_{ij}, \ldots, (\lambda/2\pi)\Delta\phi_{ij}, \ldots) \qquad (2)$$

it is possible to write:

$R=B^T A.S$, taking all of the measurements into account.

If three GPS satellites are visible, the matrices B and S can be inverted in the plane of the GPS antennas using an algorithm of the least squares type, thereby obtaining the rotation matrix A;

$$A=(B.B^T)^{-1}B.R.S.^T(S.ST)^{-1} \qquad (3)$$

Matrix A can then be filled in, out of the antenna plane, by using the relationship:

$$A^T=A^{-1} \qquad (4)$$

that is characteristic of rotations.

It can be seen that knowing the baselines $b_i$ and the phase differences between the GPS antennas for each of the visible GPS satellites, it is possible to measure attitude. Each path length difference is constituted by the scalar product of the antenna baseline vector $b_i$ multiplied by the unit vector $s_j$ for the signal propagation direction (the vector from the satellite to the observed GPS satellite). This scalar product makes use of the rotation matrix between the satellite frame and the earth frame used for the data output by the GPS receiver. Two antenna baselines, i.e. three antennas, and two GPS satellites are sufficient to determine the attitude with respect to the three axes of the satellite.

Nevertheless, there exists ambiguity in each of the measurements, which ambiguity cannot be removed without knowing the number of wavelengths of the carrier wave between the measurements of the two GPS antennas on the baseline under consideration. This problem arises whenever the pointing uncertainty exceeds 10° for $|b_i|=1$ meter (m) and $\lambda=0.20$ m.

Consequently, it suffices for the acquisition procedure to guarantee pointing that is better than 10° to avoid the problem. Otherwise, ambiguity can be removed by comparing the results provided by a large number of baselines.

Accuracy as obtained by GPS interferometry only is limited by sources of error.

A first source of error is constituted by multiple paths like those shown in FIG. 3. This effect is due to the use of radiofrequencies and is reproducible.

Other sources of noise, such as differences in cable biases, between the phase centers of the GPS antennas, or between the alignments of the antennas, can be handled as noise due to multiple paths.

Finally, there is also measurement noise essentially due to antenna thermal noise.

Together these sources of noise limit the accuracy that it is possible to achieve using a GPS system on its own, to a value of about 0.5°, even when using time filtering over several minutes.

The use of GPS interferometry in combination with a star sensor makes it possible to obtain accuracy of the same order as that provided by the star sensor, during periods when the star sensor is not usable.

Before describing how attitude is measured from the information supplied by the star sensor and how the means that perform measurement by GPS interferometry are calibrated, the way in which attitude is computed by GPS interferometry will be described more completely.

As already mentioned, the attitude of the satellite can be defined by the matrix A for passing from the satellite frame Xs Ys Zs to the orbital reference frame XYZ.

For an antenna baseline defined by $b_i$ (FIG. 3), the path length difference of the signal received from a GPS satellite i is:

$$\Delta r_{ij} = \vec{b}_i A(\theta) \vec{s}_j$$

where $A(\theta)$ is the unknown value.

A receiver associated with the antennas $18_1$ and $18_2$ constituting baseline i serves to measure the phase difference $\Delta\phi$ from which $\Delta r$ can be deduced as follows (except for an integer number k of wavelengths $\lambda$):

$$\Delta r = (\lambda/2\pi)(\Delta\phi + 2k\pi)$$

The set of measurements from a plurality of antenna baselines and a plurality of GPS satellites provides a redundant system of equations with three unknown values. For small offset angles, the equations are linear and can be solved by the least squares method. In practice, it is always possible to reduce the system to this situation by an appropriate choice of reference frame Xs, Ys, Zs tied to the satellite.

If the vector of small angles for transforming the reference system XYZ into the current satellite frame of reference Xs, Ys, Zs is written:

$$\vec{\theta} = \begin{pmatrix} \theta x \\ \theta y \\ \theta z \end{pmatrix}$$

then the measurement equation for antenna baseline $b_i$ (in the satellite frame of reference) and a GPS satellite whose direction in the local orbital frame of reference is $s_j$, is given by;

$$\Delta r_{ij} = \vec{b}_i A(\theta) \vec{s}_j$$

where:

$$A(\theta) = \begin{pmatrix} 1 & \theta z & -\theta y \\ -\theta z & 1 & \theta x \\ \theta y & -\theta x & 1 \end{pmatrix}$$

which can be written:

$$\Delta r_{ij} = \vec{b}_i \vec{s}_j + (\vec{b}_i \wedge \vec{s}_j)\theta$$

If the observation matrix is written H:

$$\left( H = \frac{\partial \Delta r}{\partial \theta} \right)$$

then the row of the matrix H which corresponds to the measurement for the ith baseline and the jth GPS satellite is:

$$h_{ij} = (\vec{b}_i \wedge \vec{s}_j)$$

With four GPS antennas, one of which is used as a master antenna, three baselines are available. The necessary measurements can be performed by using a multiplexer that enables each of the antennas to be connected in succession to a measurement system comprising a receiver, a correlator that makes use of the in-phase and quadrature components of the signal, and, for each slave antenna, a phase difference filter that delivers a phase difference, It should be observed in passing that errors due to the antennas 18 (e.g. delay differences) are common to all GPS satellites. It is therefore easy to take them into account.

To solve the system of equations (where the number of equations n×m is the product of the number n of baselines multiplied by the number m of GPS satellites used) by the least squares method, the value $\theta$ is computed that minimizes the mean square residue:

$$Q(\theta) = \sum_{q=1}^{n_m} P_q(\Delta r_q - \Delta r(\theta))^2$$

where $\Delta r_q$ is each measured value and $\Delta r(\theta)$ is the theoretical value for orientation $\theta$.

It is advantageous to give each measurement a weight proportional to $\|\vec{b}_i \wedge \vec{s}_j\|^2$ denotes a vector product. If W is the diagonal matrix of rank $n_m$ where the diagonal terms are the weights given to the measurements and the other terms are zero, the solution $\hat{\theta}$ is $$\hat{\theta} = (H^T W H)^{-1} H^T W R$$

where R is the residue vector constituted by the differences between the real measurements and the theoretical measurements for $\hat{\theta}=0$ which can be determined by calibration.

By differentiation, using two successive measurements giving $\Delta r$, the angular velocity $\dot{\theta}r$ can also be computed.

Measurement by GPS interferometry can be performed at a high rate, but the accuracy with which attitude is measured by GPS interferometry on its own is limited to a value that may be insatisfactory. For example, it is from about 0.5° to 3° when using a GPS system on its own and a satellite of the kind defined above. This limitation is due in particular to the existence of multiple paths, to differences in the properties of interconnecting cables, and to differences between the phase centers of the GPS antennas.

The latter two sources of error can be calibrated once and for all.

Accuracy can be considerably improved by taking the error due to multiple paths into account by repeated calibration using the star sensor, which enables accuracy of about 0.15° to be achieved on its own aiming axis and which enables accuracy that is almost equal to be maintained by GPS interferometry and calibration.

Before describing how calibration is performed, it may be appropriate to describe one possible way in which attitude can be measured by a star sensor. The method shown in FIG. 4 can be used providing the initial direction $\theta$ in which the satellite is pointing is known approximately with sufficient accuracy for constellation recognition to be unnecessary.

The sensor may be of a conventional matrix type, and therefore does not need to be described. It receives angles identifying the aiming direction $\theta_n$ obtained during the preceding measurement of order n and it has selection logic 40 for selecting a group of three stars for each computation, with the stars being selected from the numerous stars contained in the field of view of the sensor 16 (FIG. 2).

Figure 4:
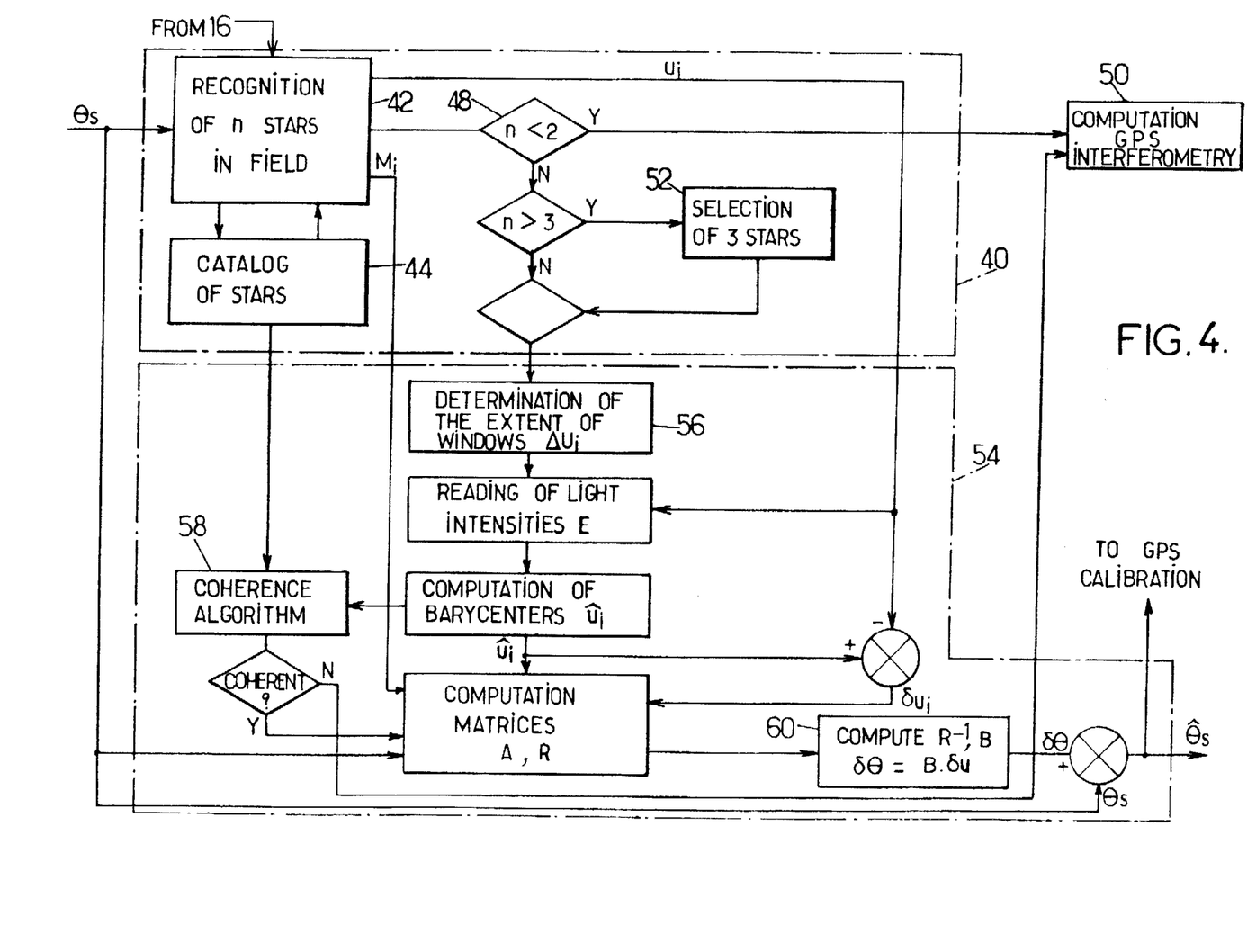
FIG. 4 is a flow chart showing the steps in computing attitude with the help of a star sensor.

The input member to the selection logic 40 is an element 42 for recognizing observed stars by referring to a catalog contained in read-only memory 44. At its output, it provides:
- the assumed angular positions $u_i$ of the observed stars as deduced from the catalog; and
- the magnitudes $M_i$ of these stars, insofar as magnitude is taken into account, A first test 48 is performed on the number of stars visible. If it is less than 2, then no measurement is performed and control is passed to the system 50 for computing attitude by GSM interferometry.

If the number of stars is greater than 3, then another step 52 serves to select three of the stars; for example the three selected stars may be the three brightest stars, or the brightest star and those at the greatest angular distances from each other and from the brightest star.

The computer 54 includes input means (or an input software step) 56 for selecting windows in the field of view to be analyzed for each selected star. It outputs a window half-width of angular extent $\Delta u_i$ for each selected star of position $u_i$.

Typically, the detector includes a CCD matrix whose photosensitive sites are read in each of the three windows extending from $u_i - \Delta u_i$ to $u_i + \Delta u_i$, thus providing light intensity signals E for each of the photosensitive sites in each window. Conventional barycenter computation on each spot corresponding to a star supplies an estimated value $0_i$, which in general is different from $u_i$ and due to the difference between the input value $\theta s$ and the real value for which an estimate $\hat{\theta}s$ is being sought.

Measurement consistency or coherence can be determined at 58 by applying an algorithm for evaluating a coherence index which uses as reference the stored characteristics of the observed star and which serves to avoid errors due to the presence of another satellite or a distant planet in the field of view. The resulting index is compared with a threshold.

The accepted results $0_i$ are used to form the rotation matrix A and the matrix R as defined by above equation (2).

The matrix A is made up of elements $-0_i$, i.e. matrix elements representing rotations about the vector $\vec{u_i}$:

$$A = (\ldots, 0_n, \ldots)$$

The matrix R is made up of terms $r_{ij}$ which are functions of the magnitude $M_i$ of the measured star and of the measured direction $0_i$, it is also possible to give it a value that is a function of $\dot{\theta}$, i.e. the displacement speed:

$$R = (r_{ij})$$

where $r_{ii} = f(M_i, 0_i, \theta')$
for $i = 1, 2,$ or $3$, as a general rule.

Finally, values are computed for $\delta u_i$ each corresponding to the difference between a position predicted from the catalog $u_i$ and the position $0_i$ as actually estimated on the basis of measurement.

During a following computation step, at 60, the matrix $R^{-1} = (\ldots, 1/r_{ii}, \ldots)$ is computed that can be considered as being the inverse of the noise covariance matrix. To a first approximation, it is a diagonal matrix, thereby minimizing the number of operations. It then becomes possible to compute B which is the main matrix of the problem. This is the matrix which makes it possible to define the vector of the differences between the predicted attitude and the measured attitude.

The product $B.\delta u$ provides the attitude increment $\delta\theta$ which is added to the original value $\theta s$ and supplies an estimate $\hat{\theta}s$ which is used instead of $\theta$ for the following measurement and will then serve to recalibrate the apparatus for measurement by GPS interferometry. To obtain sufficient accuracy, it is generally necessary to perform measurement at a rate of at least 8 Hz.

Figure 5:
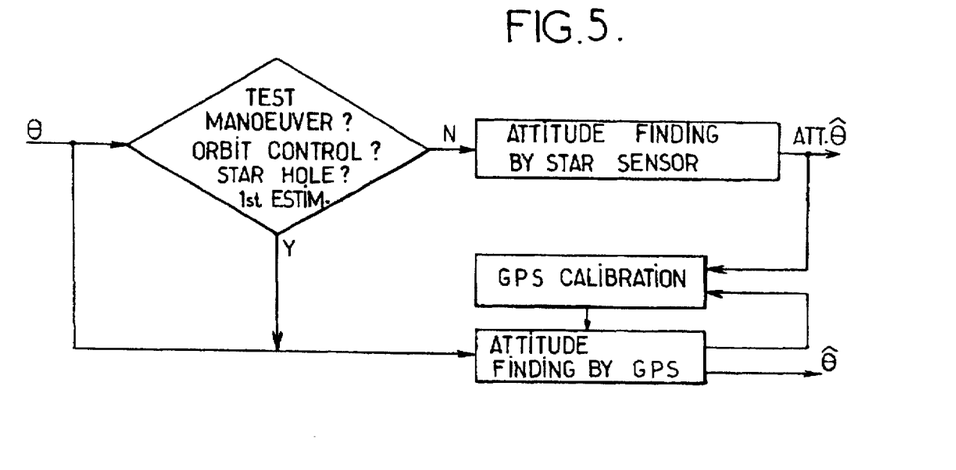
FIG. 5 is a flow chart of the algorithm for selecting between attitude measurement modes.

The algorithm for selecting between GPS interferometry measurement and measurement by means of the star sensor may be as shown in FIG. 5, assuming that a rough initial measurement is already available, e.g. by three-axis magnetometry. The measurement is performed by the star sensor except when that is not possible. Whatever method is used, the results of the measurement are fed back to the input.

Figure 6:
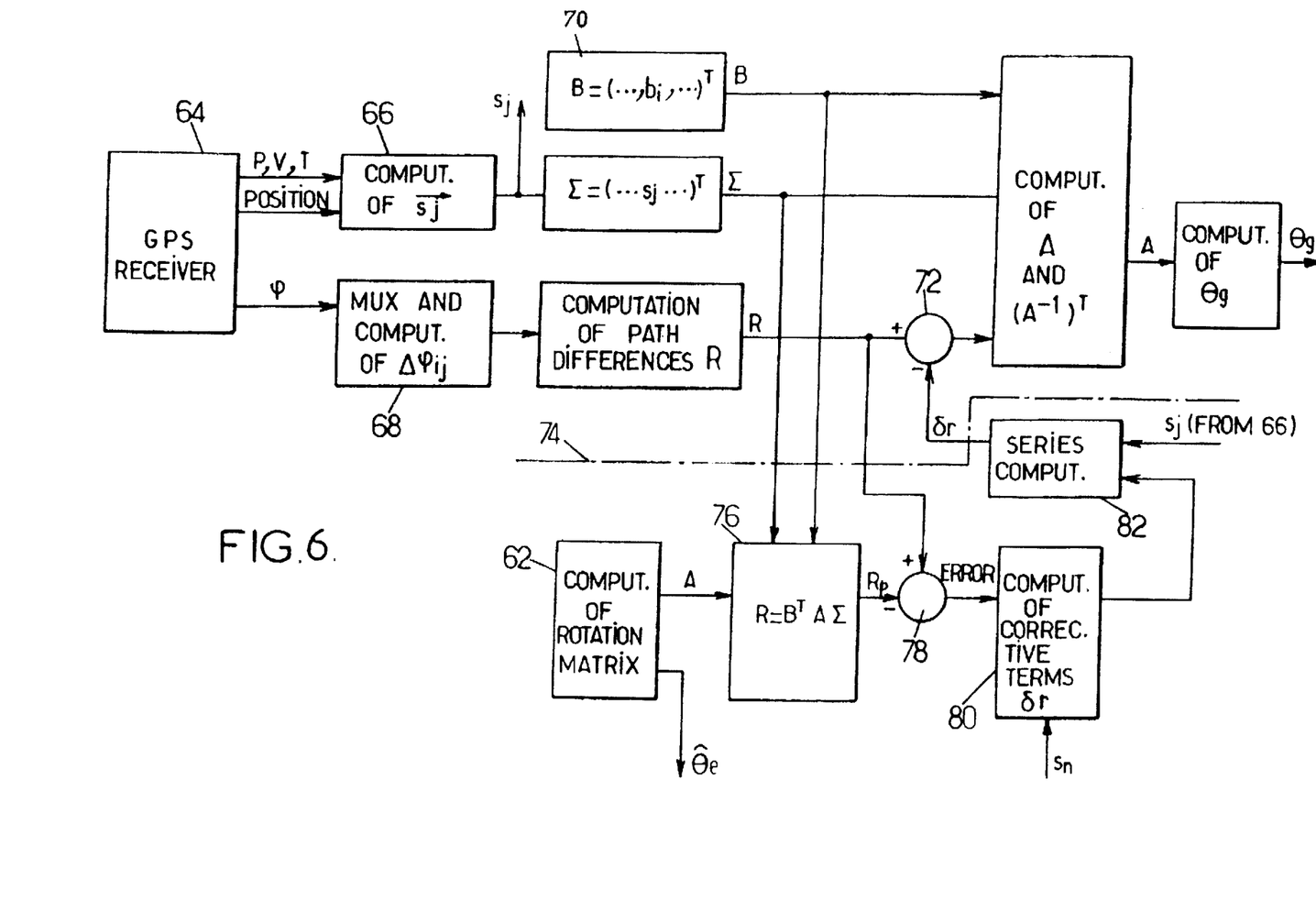
FIG. 6 is a block diagram showing the sequence of operations that enable fine altitude measurement to be performed by calibrating the means that use the GPS system.

Finally, with reference to FIG. 6, the method of calibrating the apparatus for measurement by GPS interferometry is described. In FIG. 6, block 62 designates the means shown in FIG. 4 that provide the rotation matrix A and the angles defining attitude (referred to overall as $\theta e$ to distinguish them from angles $\theta g$ obtained by GPS interferometry).

The GPS receiver connected sequentially to the various antennas delivers:

the position P and the velocity V of the satellite together with the time T;

the orientations of the GPS satellites; and the phases $\phi$ for the various antennas and the various satellites corresponding to the unit vectors $s_j$.

On that basis, and with the help of multiplexing enabling the phases $\phi$ to be compared, the phase differences $\Delta\phi_{ij}$ are computed at 68 for all of the baselines $b_j$. At 66, the unit vectors $\vec{s_j}$ are also computed. The direction vectors of the GPS signals are deduced therefrom as constituted by the sum matrix $\Sigma$:

$$\Sigma = (\ldots, s_j, \ldots)$$

The above-defined path length differences are computed from the values of $\Delta\phi$ giving rise to a matrix Dr.

A separate block 70 provides the vector of antenna baselines:

$$B = (\ldots, b_p, \ldots)^T$$

From there, it is possible to use equation (3) to obtain A which can also be written in the antenna plane as follows:

$$A = (B.B^T)^{-1}.B.R.\Sigma(\Sigma.\Sigma^T)^{-1}$$

From the matrix A in the antenna plane, it is possible to deduce the matrix for rotation out of said plane (equation 4). Consequently, knowledge of A makes it possible to compute the attitude angles, designated $\theta g$ to distinguish them from those obtained using the star sensor.

The above described computation does not make use of calibration. Calibration at 72 consists in adding correction terms $\delta r$ to the values R computed on the basis of the interferometric signals.

The calibration means 74 which provide the correction terms comprise hardware or software means 76 which compute a predicted path length difference $R_p$, this time on the basis of values for A obtained using the star sensor, and for $\Sigma$ and B coming from the interferometric apparatus:

$$R_p = B^T.A.\Sigma$$

By subtraction at 78, an estimate is obtained for the errors on the path length differences due to multiple paths, corresponding to the above-mentioned phase errors $\Delta\phi_{ij}$. From there, correction terms can be computed on the basis of a multipath model. In general, a Legendre polynomial model having two variables will be used since that is well adapted to representing a function of two variables such as the direction of the incident GPS signal. The accuracy is that of truncation in the model. The correction operation can comprise in succession:

at 82, resetting the computation of the coefficients in the series; and at 80, computing the correction terms $\delta r$.

A computation must be performed for each baseline $b_i$ and for each GPS satellite direction $s_j$. To reduce the computing load, it is possible to use the same frame to define the aiming angles for all of the antenna baselines. Legendre function computation is then performed once only for each satellite. Since multipath variation is at relatively low frequency, knowledge of the previous attitude suffices to determine the sighting angles in a frame of reference tied to the antennas. There is therefore no iteration on multipath calibration. Only as many Legendre series are computed as there are satellites. These series are obtained by recurrence relationships and then normalized by means of a precomputed table of all of the factors to be applied to the functions. All of the matrices required for solving the following are then available:

$$B^T A \Sigma = \phi, \text{ where}$$

$\Sigma$ is the matrix of $s_j$ in an inertial reference frame;

B is the matrix of antenna baselines in the satellite reference axes; and

Figure 7:
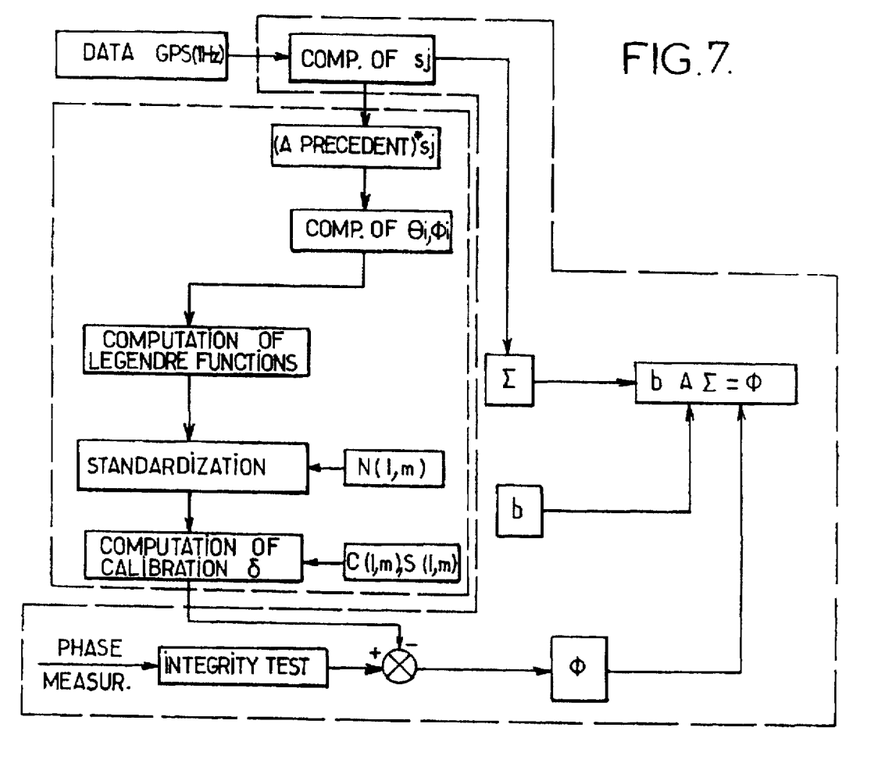
FIG. 7 is a flow chart showing details of the algorithm for calibrating the means that compute attitude by GPS interferometry with the help of the solar sensor.

A is the matrix for passing from the inertial frame to the satellite frame. These steps are summarized in FIG. 7.

The matrix A is determined by the least squares method. The matrix B is of order 2, since the four antennas are coplanar. As a result $B.B^T$ is of order 2. It is possible to write:

$$b = \frac{\beta \quad \begin{vmatrix} 0 \\ 0 \end{vmatrix}}{0 \ 0 \ | \ 0} \text{ and } A = \frac{a \quad | \quad c}{u \ v \ | \ w}$$

where $\beta$ is of dimension 2 by 2;

a is of dimension 2 by 2;

c is of dimension 2 by 1.

Least squares solving gives a and c. The scalar triplet (u, v, w) is determined by three additional equations, namely:

$$\det(A)=1$$

and $$AA^T = Id_3 \iff a \begin{pmatrix} u \\ v \end{pmatrix} + cw = \begin{pmatrix} 0 \\ 0 \end{pmatrix}$$

or indeed:

$$r \begin{pmatrix} u \\ v \\ w \end{pmatrix} = \begin{pmatrix} 0 \\ 0 \\ 1 \end{pmatrix}$$

Figure 8:
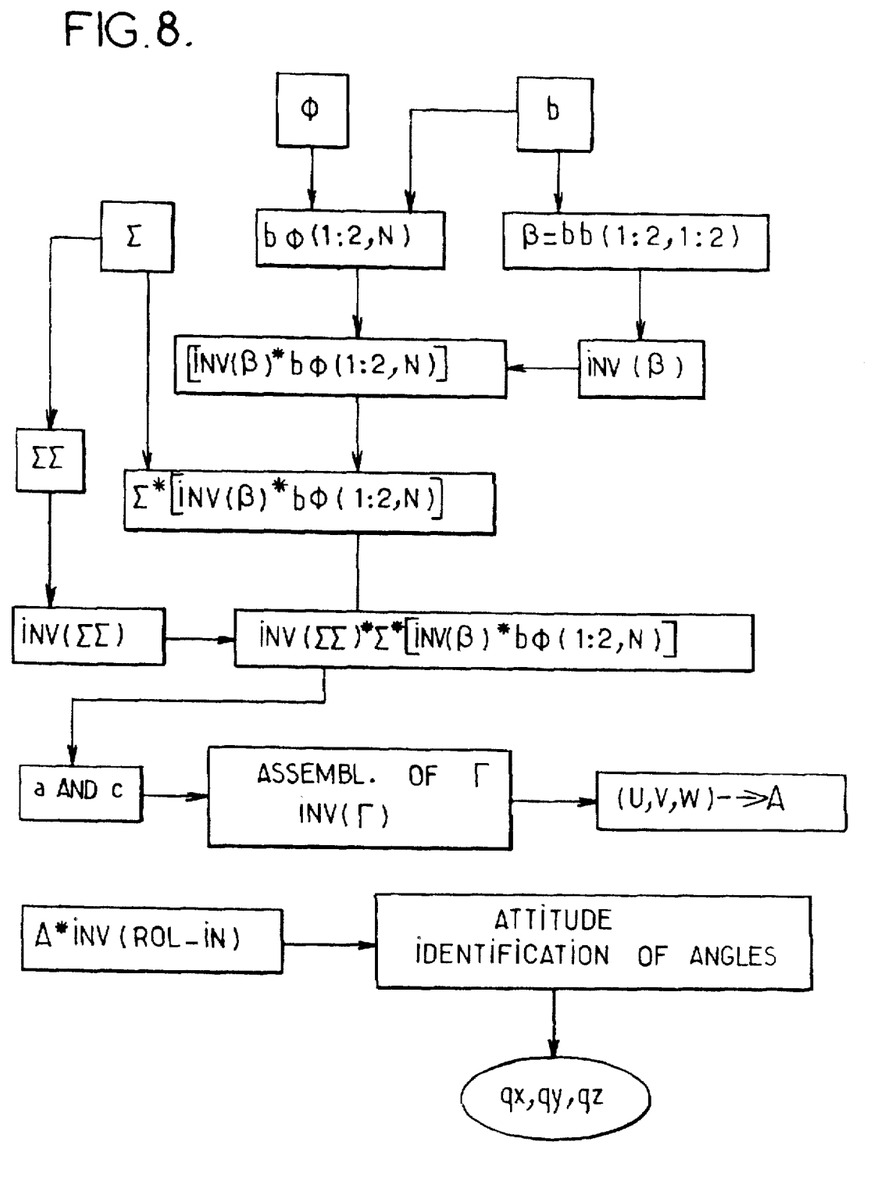
FIG. 8 shows details of the sequence of computations.

The attitude matrix is then the product of A multiplied by the matrix for passing from the local orbited frame of reference to the inertial frame of reference which can be written inv(Ro1.In) and the angles $\theta x$, $\theta y$, and $\theta z$ are then determined by mutual identification. The computation can be performed in steps as summarized in FIG. 8, with the usual mathematical notation conventions.

Possible modifications will appear to those familiar with the relevant art. The term "global positioning system" should be understood broadly as applicable to any constellation of satellites on a plurality of low earth orbits even distributed angularly.

I claim:

1. Apparatus for measuring the attitude of an earth satellite in a reference frame, comprising:

a heavenly body sensor carried by a body of said earth satellite for detecting angular positions of a plurality of identifiable heavenly bodies with respect to said body of the earth satellite, a plurality n of antennas carried by said body of the earth satellite, n being an integer greater than two, said antennas being arranged for receiving radio signals from a plurality of GPS satellites of a satellite global positioning system and for pairs of said antennas to define a plurality of base lines having different angular positions on said body, processing means for processing radio frequency signals received by said antennas from said GPS satellites, for measuring a plurality of phase differences each between the radio frequency signals received from a same one of said GPS satellites by the antennas of a same one of said pairs, and for computing an attitude of the earth satellite from said phase differences, and means for repeatedly calibrating measurements made by said processing means, based on measurements performed by said heavenly body sensor when said heavenly body sensor provides usable data.

2. Apparatus according to claim 1, wherein said heavenly body sensor is a star sensor.

3. Apparatus according to claim 2, wherein said star sensor has an angular field of view that ranges from 25×25° to 35×35° and said heavenly body sensor arranged for detecting the angular positions of a limited number of brighter stars stored in a star catalog.

4. Apparatus for measuring the attitude of an earth satellite in a frame of reference, comprising:

a star sensor carried by a body of said earth satellite for simultaneously detecting positions of a plurality of identifiable stars with respect to said body of the earth satellite, a plurality n of non-mutually aligned antennas carried by said body of the earth satellite, n being an integer greater than two, said antennas being arranged for receiving radio signals from a plurality of OPS satellites belonging to a satellite global positioning system and for each pair of said antennas to define base lines defined by the different pairs having different angular positions, means for processing radio frequency signals received by said antennas from said GPS satellites, measuring phase differences thereof and computing an attitude of said earth satellite from said phase differences during periods when the star sensor does not provide useful data; and means for repeatedly calibrating measurements made by said processing means based on measurements performed by said star sensor, comprising means for determining a corrective term for each of said base lines and each of said GPS satellites from a comparison between simultaneous measurements by said processing means and said star sensor.

5. Apparatus according to claim 4, further comprising a 3-axes magnetometer and means for removing ambiguities concerning the attitude of said earth satellite based on signals delivered by said 3-axes magnetometer.

6. Apparatus according to claim 4, comprising four of said antennas located at corners of a side of said earth satellite, wherein said means for computing said attitude are arranged for carrying out a plurality of computations, each based on signals received from a specific set of three said antennas.

7. Apparatus according to claim 6, wherein said processing means are arranged for carrying out nm measurements, n being a number of base lines each defined by a pair of said antennas and m being a number of available GPS satellites and for determining the attitude by computing an average value by the least square method.

8. Apparatus according to claim 4, further comprising mask means on said body for limiting an angular opening of a field of view of each antennas to a value smaller than 180°.

9. Method for measuring the attitude of an earth satellite in a reference frame, including the steps of:

(a) repeatedly carrying out attitude measurements based on information provided by a star sensor during all periods of time when the star sensor delivers an image of at least two stars, a first one of said attitude measurements being made starting from an attitude indication obtained by GPS interferometry for avoiding a step of recognition of constellations;

(b) repeatedly carrying attitude measurements by interferometry from signals delivered by at least three GPS antennas carried by a body of the satellite during periods when the star sensor does not provide usable data, and (c) repeatedly calibrating the measurements carried out by interferometry from said measurements carried out based on information received from the star sensor when the latter delivers usable data.

10. Method according to claim 8, wherein calibration is carried out by using a mathematic model and a system of Legendre polynomials having two variables.

* * * * *

UNITED STATES PATENT AND TRADEMARK OFFICE
CERTIFICATE OF CORRECTION

PATENT NO. : 5,831,572
DATED : Nov. 3, 1998
INVENTOR(S) : Patrice Damilano

It is certified that error appears in the above-identified patent and that said Letters Patent is hereby corrected as shown below:

Column 10, line 35, replace "OPS" with --GPS--.

Signed and Sealed this

Ninth Day of March, 1999

Attest:

Q. TODD DICKINSON

*Attesting Officer*   Acting Commissioner of Patents and Trademarks